United States Patent [19]
Knippel

[11] 3,906,866
[45] Sept. 23, 1975

[54] TRACTION POWER RAIL MODULE
[75] Inventor: Willis H. Knippel, Palos Park, Ill.
[73] Assignee: Pullman Incorporated, Chicago, Ill.
[22] Filed: May 23, 1974
[21] Appl. No.: 472,578

[52] U.S. Cl. ................. 104/139; 104/245; 105/30; 105/73
[51] Int. Cl.² .......................................... B61F 13/00
[58] Field of Search ....... 104/89, 91, 106, 107, 118, 104/139, 147 R, 243, 245, 124, 119; 105/30, 31, 73, 141, 453, 75, 147

[56] References Cited
UNITED STATES PATENTS

| | | | |
|---|---|---|---|
| 432,204 | 7/1890 | McLaughlin | 104/139 |
| 715,791 | 12/1902 | Happe | 105/453 X |
| 2,128,072 | 8/1938 | Brecht | 105/75 |
| 3,012,521 | 12/1961 | Lich | 105/141 |
| 3,469,536 | 9/1969 | McCracken | 105/30 |
| 3,518,947 | 7/1970 | Borst | 105/30 |
| 3,648,617 | 3/1972 | Metzner | 105/30 X |

*Primary Examiner*—Lloyd L. King
*Assistant Examiner*—Andres Kashnikow
*Attorney, Agent, or Firm*—Richard J. Myers

[57] ABSTRACT

A traction power rail module which is supported on an elevated guideway including a sloping track whereby the self powered module or railcar unit may be moved to upper and lower levels by module rubber traction wheels driven by and connected to a power clutch, brake differential and motor structure pivotally and movably supported on a wheeled truck platform with truck wheels guidingly and movably supported on a track in the elevated guideway. The motor structure is provided with a force device in the form of fluid operated ram lift elements which raise and lower the motor structure and traction wheels thereby frictionally against the channel flanges of the guideway for stopping, starting, and driving movement of the module on the guideway.

3 Claims, 6 Drawing Figures

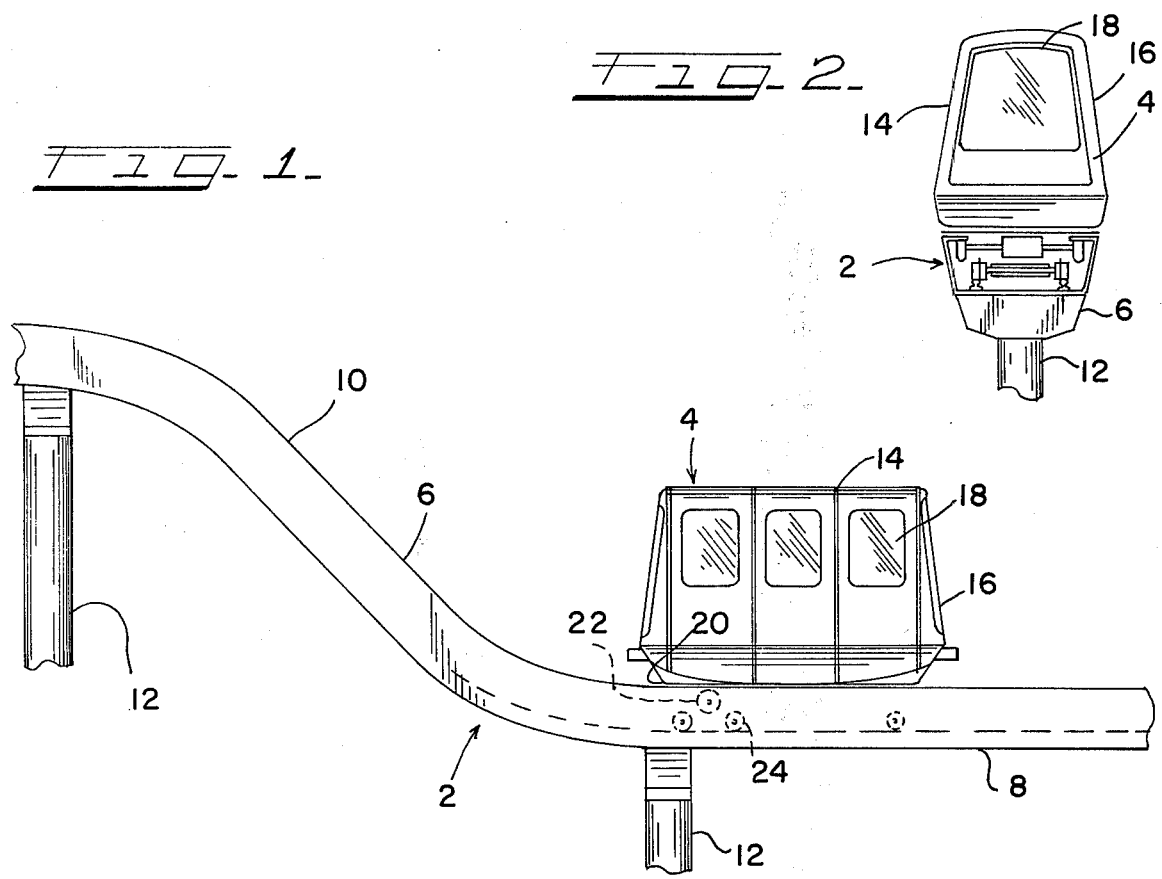
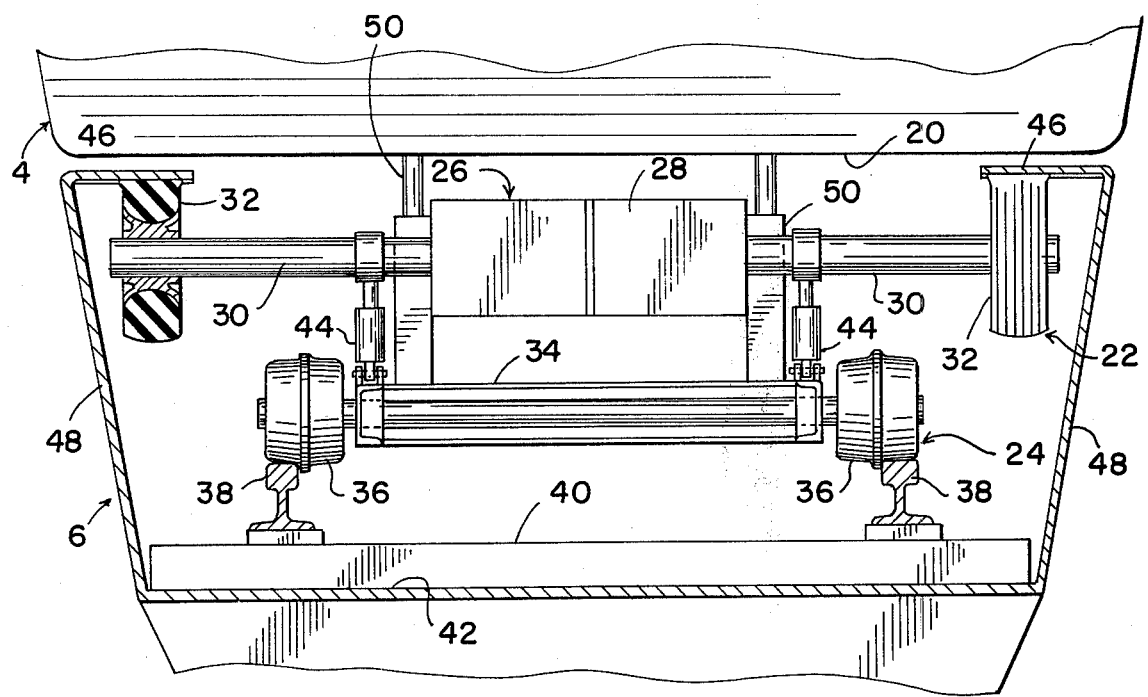

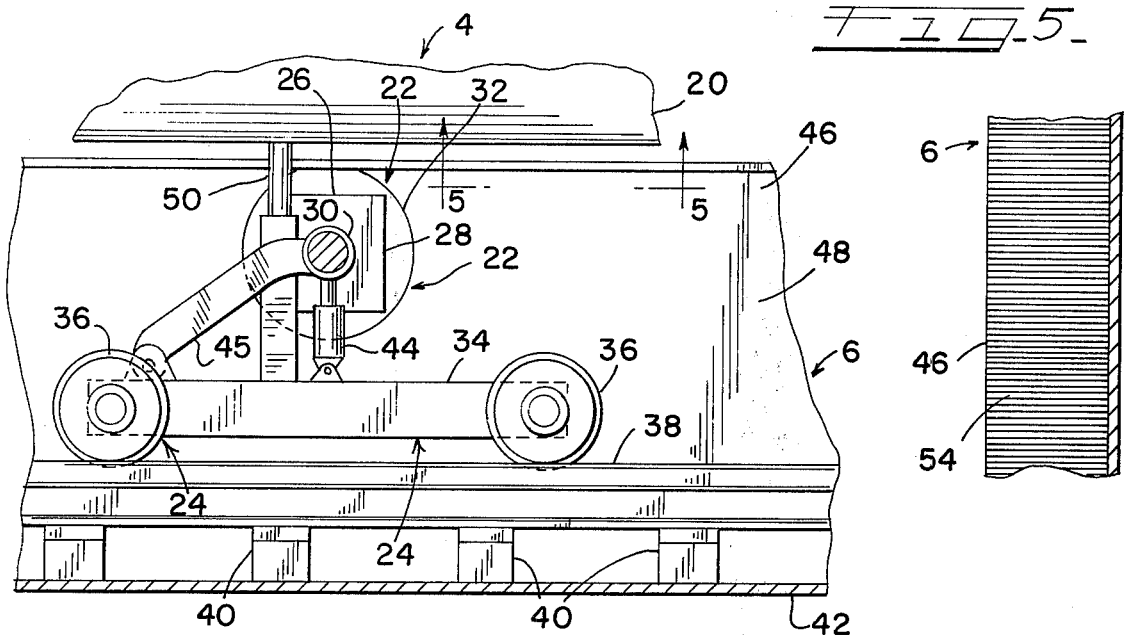
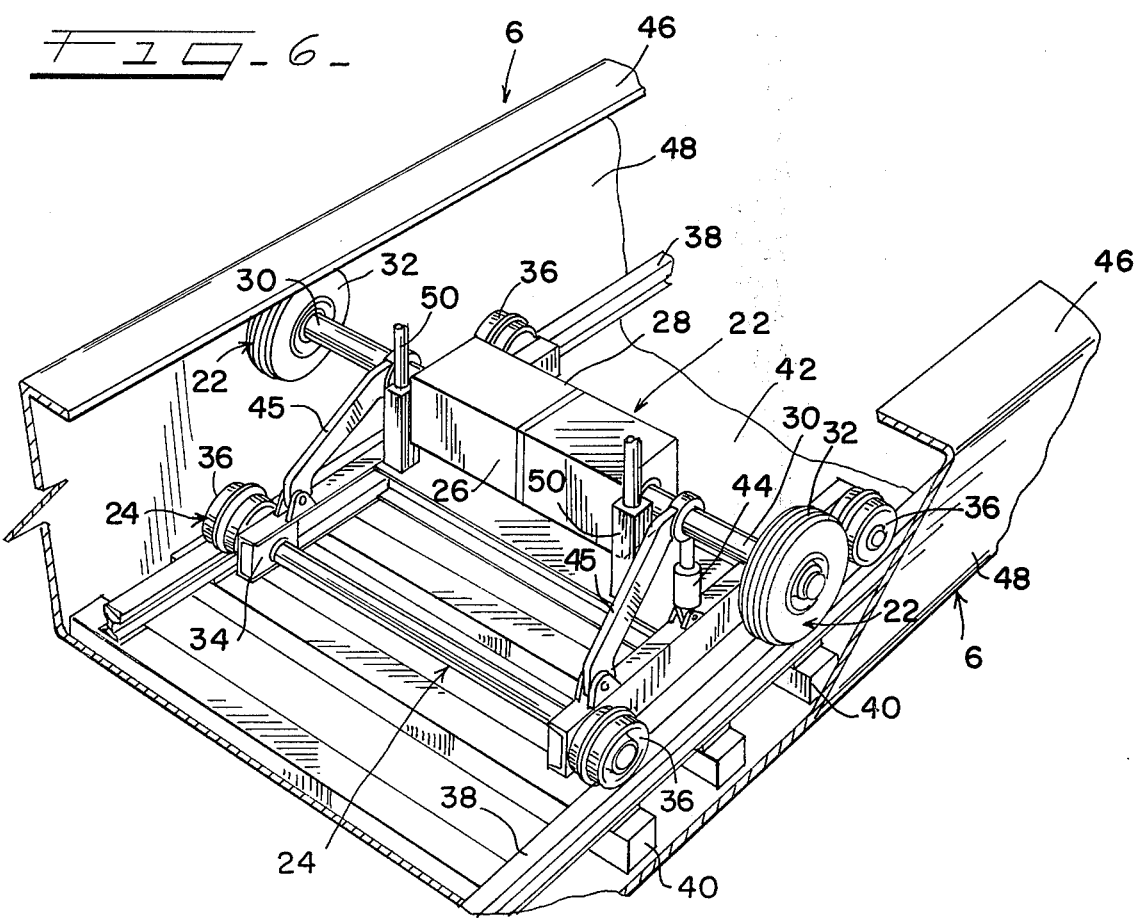

TRACTION POWER RAIL MODULE

BACKGROUND OF THE INVENTION

1. Field of the Invention

This invention relates to rail guide modules that are capable of going up and down inclined track sections and in particular, relates to the self traction powered railcar unit driving over elevated sections which may have varying slope portions.

2. Description of the Prior Art

It is heretofore known to provide various traction devices in elevated track arrangements for transportation of personnel or freight. However, there is no showing of a module having a traction means driven by power means and frictionally engaging a guideway in a variable manner for moving or holding a vehicle on a slope by fluid extension between the traction means on the upper part of the guideway and the movable support or truck of the vehicle on a lower rail in the guideway to insure climbing and stopping even on the steepest grades. This is what this invention purports to do.

SUMMARY

It is a general object of this invention to provide a traction propelled rail mounted module for movement on rail means in a sloped guideway means and more particularly to provide for a traction wheel rail car unit where traction wheel means is articulated with respect to the truck means of the module where the traction wheel means and truck means are both in the guideway means.

A further object of this invention is to provide for a passenger module having pivotally attached traction means such as rubber tired wheels or the like articulatedly connected to the module truck means within an elevated guideway containing truck engaging rails means and an overhead wheel engaging flange.

These and other objects will become more apparent from reference to the following description, appended claims and attached drawings.

BRIEF DESCRIPTION OF THE DRAWINGS

FIG. 1 is a general pictorial type presentation inside elevation of the transportation system employing the novel traction arrangement;

FIG. 2 is an end elevation of the showing of FIG. 1;

FIG. 3 is an enlarged partial view of that of FIG. 2 and illustrative of the traction and truck components;

FIG. 4 is a side elevation enlargement of the traction and truck components;

FIG. 5 is a sectional view taken along line 5—5 of FIG. 4; and

FIG. 6 is a perspective view of the rail guideway and traction and truck components therein for the module or passenger car.

DESCRIPTION OF THE PREFERRED EMBODIMENT

With reference to the drawings, and in particular with reference to FIG. 1, there is shown an overhead or elevated tramway 2 supporting a module or passenger car 4 for movable transporting support thereon. The tramway 2 includes the elevated guideway structure 6 including a horizontal portion 8 and a slope portion 10 supported by columns or beams 12. The module 4 includes a body 14 having a passenger compartment 16 with windows 18 for viewing and an underframe structure 20 which includes a traction unit 22 and a truck unit 24.

As shown, for instance, in FIGS. 2–6, the traction unit 22 has a power drive mechanism 26 which includes a power clutch, a brake differential and motor (power) unit also shown schematically in the box 28. The drive mechanism 26 is provided at opposite ends with projecting drive shafts 30, 30 on which rubber or the like traction wheels 32, 32 are driven. The motor, clutch, brake differential unit 28 is supported on the truck unit 24 by the truck platform 34 which includes four flanged guide wheels 36 which in turn are supported on conventional type rails 38 on cross ties 40 in the bottom wall or support floor 42 of the guideway structure 6.

Fluid actuated jack means in the form of fluid activated piston and cylinder structure 44 are pivotally attached to the track platform 34 and to the drive shafts 30, 30 and raise and lower the unit 28 relative to the truck platform 34. The cylinders 44, 44 act as normal force devices when activated to raise the motor clutch brake unit 28 so that the rubber driven wheels 36 engage the upper overhead flanges 46 of the guideway structure which has side walls 48, 48 connecting the flanges or overhead guide elements 46 with the floor section 42. Pivot arms 45, 45 pivotally connect between the truck platforms and the shafts 30, 30 for guidance of the unit 28 upwardly. The underframe 20 has connecting members or support structures 50, 50 extending down and connecting with the platform 34.

As the rubber wheels are powered or driven by unit 26, the powered module 4 travels along the guideway. When it is desired to move the module upwardly or downwardly on inclined track or rail portions 10 (see FIG. 1) of the guideway structure 6, increased pressure on the normal force device or jack means 44, 44 by a source of pneumatic pressure within drive mechanism 26 and developed by motor, provides for greater friction engagement of the driven rubber wheels against the overhead flanges 46, 46 so that the power module 4 can effectively, and in a desired controlled speed, climb upward or descend downwardly. The jack means provides an adjustable force for varying the friction as required. This type of power module can move up a vertical track or rail means because of its ability to vary the frictional forces by adjusting the pneumatic cylinders or normal force devices. It is noted in FIG. 5 that the inside surface 54 of the flanges 46 is undulated or rough to provide better friction gripping for the wheels 32.

By this arrangement of module 4 and its guideway structure 6 there is provided propulsion, braking and steering in the mechanism 26. One or more modules 4 can be used to propel people in a people mover or passenger compartment or to transport freight in a freight mover to meet urban density congested conditions. The arrangement provides a rail smooth ride but has traction beyond any rubber (or the like) tired vehicle. The module having the ability to climb steep grades makes it possible to park the vehicles in a small space, reducing the cost of stations. Vehicles could climb to different floor levels of buildings.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A combination of a guideway structure and a traction power module movable along said guideway structure, said guideway structure comprising a floor and rail means mounted on said floor and a pair of transversely spaced overhead flanges spaced above said floor, truck means supported on and depending from said module, said truck means including a truck platform having longitudinally spaced pairs of wheels supported on said rail means, a traction device on said truck means including a power transmission and control means, power driven shafts projecting outwardly from said power transmission and control means, a traction wheel mounted on each of said shafts to be driven thereby, each traction wheel being adaptable to engage said flanges in fractional driving relation, pivotal link means supporting said traction device on said platform, and fluid extendable means supported on said truck means for moving said link means to raise and lower said traction device and to exert a force varying the degree of frictional engagement at said traction wheels in driving engagement with said flanges.

2. The invention in accordance with claim 1 said pivotal link means including arms having end portions pivotally connected to said truck means and to said power transmission and control means, and said fluid extendable means including a piston and cylinder assembly pivotally supported on said truck means and connected to said power transmission and control means for moving the same toward and away from said flanges.

3. The invention in accordance with claim 2 said arms having second end portions on which said shafts are journalled.

* * * * *